Figure 1:
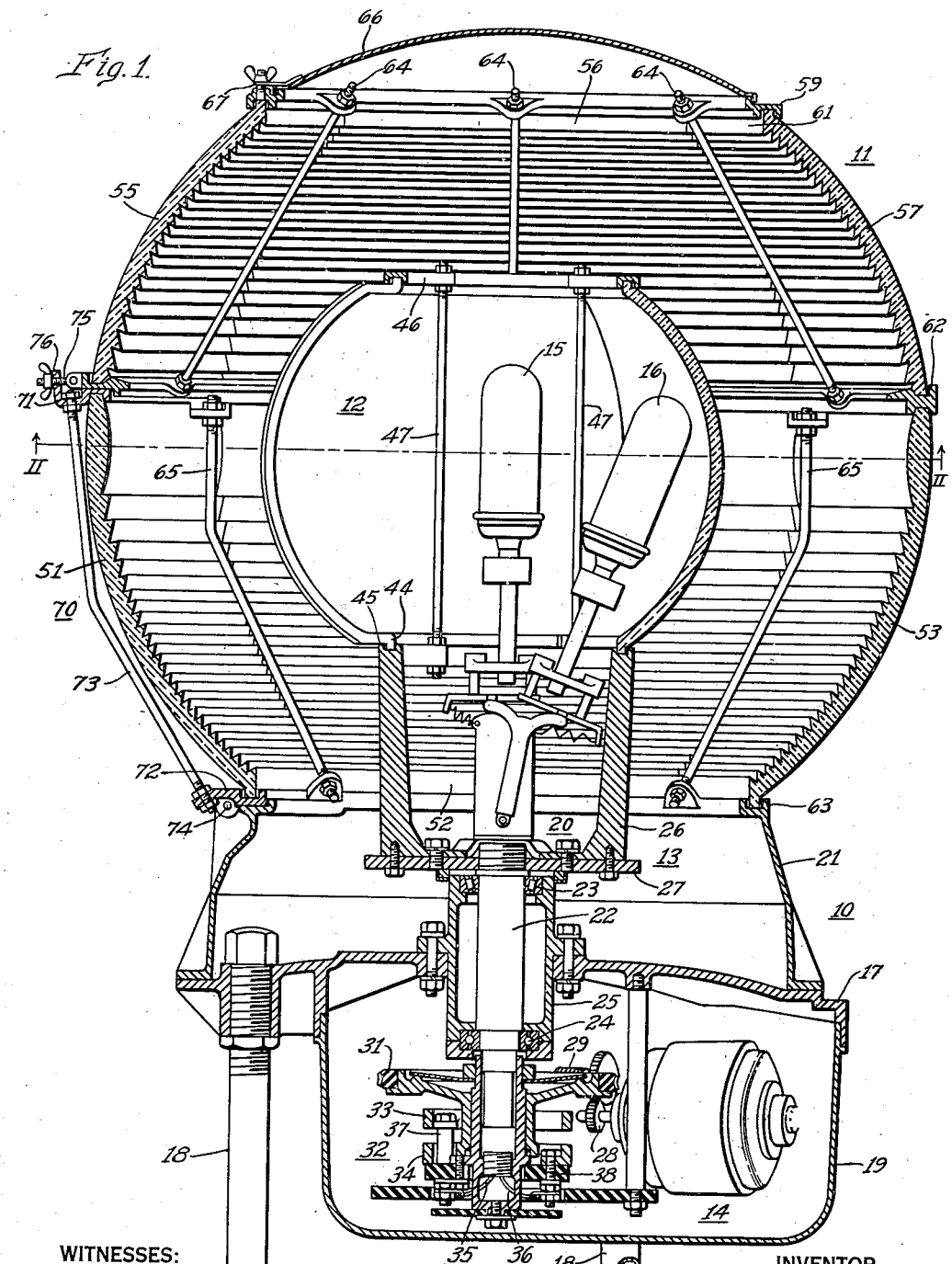

Feb. 22, 1949.     W. A. PENNOW     2,462,222
BEACON LIGHT
Filed Aug. 19, 1943     2 Sheets-Sheet 1

WITNESSES:
C. J. Weller.

INVENTOR
Willis A. Pennow.
BY
M. Crawford
ATTORNEY

Patented Feb. 22, 1949

2,462,222

UNITED STATES PATENT OFFICE 2,462,222

BEACON LIGHT

Willis A. Pennow, Cleveland, Ohio, assignor to Westinghouse Electric Corporation, East Pittsburgh, Pa., a corporation of Pennsylvania Application August 19, 1943, Serial No. 499,243

5 Claims. (Cl. 240—1.2)

My invention relates, generally, to beacon lights and, more particularly, to rotating beacons for use on airports and airways as an aid to aerial navigation.

Heretofore, such beacons have been constructed either in the form of a searchlight with a rotatable drum or in the form of large semaphore lenses mounted in a rotatable housing. Such devices have been found to have certain undesirable disadvantages as both involve rotation of exposed surfaces or parts and relatively large masses requiring considerable power. Both are also subject to ice-lock in areas where freezing rains and sleet cause large formations of ice between the stationary and rotating parts of the exposed beacon, thereby rendering it useless or creating a hazardous situation because of the emission of a false signal.

In addition, these types of beacons are limited as to the number of different signals that may be emitted without getting into undesirable mechanical complications. At most, it is possible to obtain only two signals per light source due to the limits in optical design. When additional signals are required for coding purposes, additional light sources must be added or auxiliary beacon units employed.

Accordingly, it is an object of my invention, generally stated, to provide an improved type of rotating beacon which shall not have the foregoing disadvantages, which shall be of simple and economical construction, and which shall be reliable in operation.

A more specific object of my invention is to provide a rotating beacon which shall not have exposed rotatable or moving parts.

Another object of my invention is to provide a rotating beacon wherein the moving or rotatable part or parts is contained within an outer stationary light transmitting part.

A further object of my invention is to provide a rotating beacon wherein an inner lens and light source are rotatably mounted within an outer stationary lens.

Another object of my invention is to provide a beacon of the character described wherein the inner and outer lenses are made up of prismatic or Fresnel lens elements or refractors, preferably in the form of spherical or globular assemblies, with the prism structures so arranged that the light emitted is in the desired beam pattern and whereby several beam patterns from the single light source may be produced and the color thereof determined by the use of colored glass portions of the inner lens.

Figure 2:
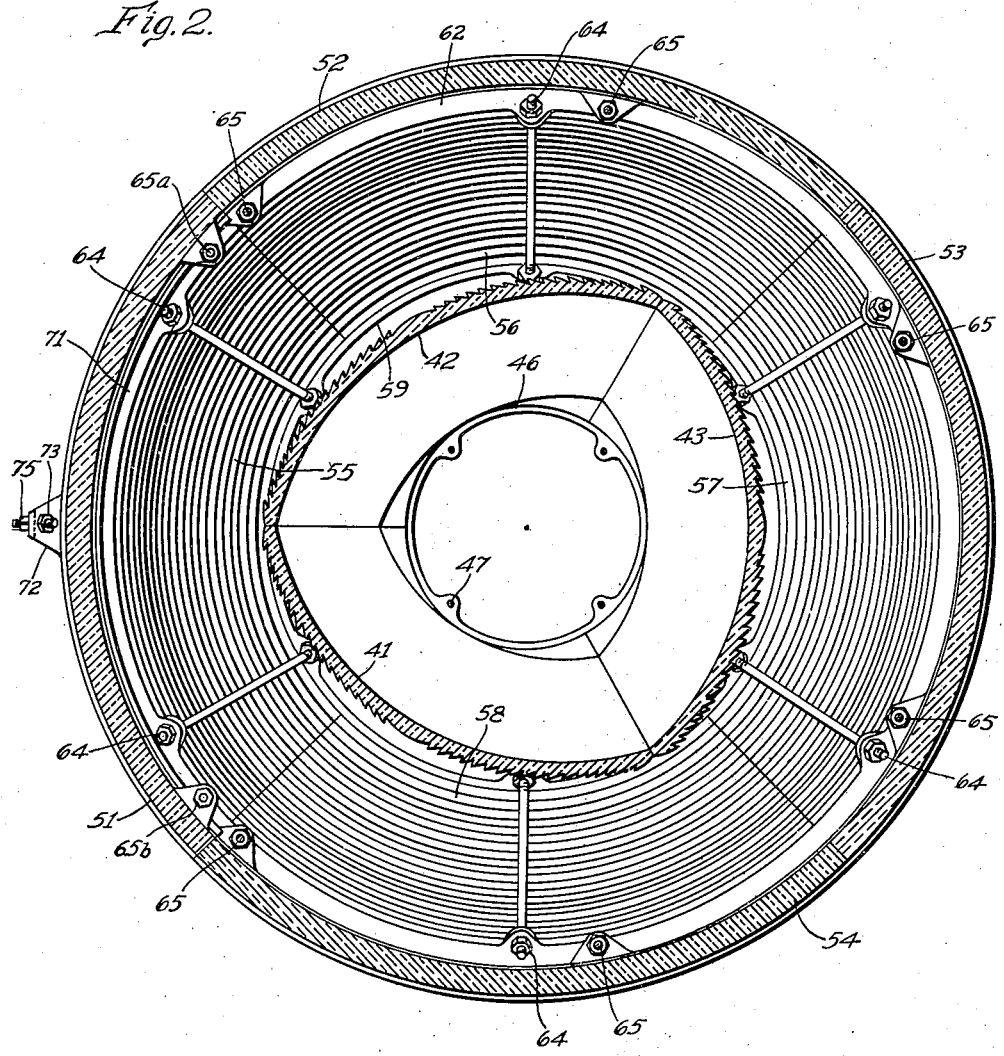

These and other important objects and advantages of my invention will become more apparent from the following detailed description when read in conjunction with the drawing, wherein:

Figure 1 is a side elevational view, partly in section, of a beacon embodying the principal features of my invention; and Fig. 2 is a cross-sectional view along lines II—II of Fig. 1 to show the shape and relation of the inner and outer lens assemblies.

Referring to Fig. 1 of the drawing, which illustrates one embodiment of my invention, the beacon light comprises, generally, a base assembly 10 which supports a stationary outer lens assembly 11 within which a rotatable inner lens assembly 12 is mounted on a rotatable support 13 driven by a suitable motor 14 mounted within the base assembly. Upon the support 13, there is also mounted a suitable lamp-changer mechanism 20 of well-known construction for supporting a pair of lamps 15 and 16. The lamp-changer mechanism 20 functions in a known manner to position one or the other of the lamps 15 and 16 to produce the desired light.

The base assembly 10 may be of any suitable form and, in this instance, is comprised of a bedplate 17 to which depending supporting rods 18 are attached, a housing 19 secured to the bottom thereof forming a compartment for the motor and other mechanism, and a sub-base 21 mounted on the top thereof for supporting the outer lens assembly 11.

The rotatable support assembly 13 for the inner lens assembly 12 may comprise a vertically-disposed drive shaft 22, rotatably mounted in bearings 23 and 24 carried by a tubular bearing holder 25 mounted on the bedplate 17, and a support member 26 mounted on the upper end of the shaft by means of a mounting plate 27 for supporting the inner lens assembly 12 and lamp-changer mechanism 20, as shown.

The shaft 22 is driven by the motor 14 through reduction gears 28, a worm 29, and worm gear 31 mounted on the lower end of the shaft within the housing 19.

There is also attached to the lower end of the shaft 22 a current-collector assembly 32 of known construction comprising, generally, a pair of insulated slip rings 33 and 34 connected to conductors 35 and 36, respectively, through their mounting studs 37 and 38, the conductors 35 and 36 extending up through shaft 22 for connection with suitable terminals on the lamp-changer mechanism 20. As will be apparent, the slip rings rotate with the shaft and engage a pair of brushes (not shown) which are connected to a suitable source of current.

Considering now the detailed structure and arrangement of the lens assemblies 11 and 12, it will be observed, with reference to both Figs. 1 and 2, that each of these assemblies is made up of a plurality of interfitting prismatic lens elements or segments. While it is possible to make these lenses in one piece, it is more practical and economical to make them up in sectionalized form, as shown. It will be observed that both are globular or generally spherical in shape, and are of the Fresnel type for controlling the light in a manner to be described more in detail hereinafter.

The inner lens assembly 12 is comprised of a plurality, three in this instance, of complementary Fresnel lens elements or segments 41, 42 and 43 which fit together, as shown in Fig. 2, with their lower edges 44 positioned in the channel 45 in the upper end of the support member 26. These segments may be held together by a channeled lens ring 46 positioned on the upper edges of the segments and tied to the support member 26 by a plurality of tie bolts 47 to provide a rigid unitary assembly.

By means of this arrangement, the inner lens assembly can be made up of as many lens segments as desired depending upon the number of beams desired. The particular arrangement shown and described is for a tri-beam distribution or light signal. By utilizing lens segments of different colors, any desired color of the beams may be produced.

The outer or stationary lens assembly 11 is, in this instance, formed of a plurality of complementary upper and lower segments. As shown in Fig. 2, there are, in this instance, four 90° lower segments 51, 52, 53 and 54. The upper part of the lens is also formed of four 90° segments 55, 56, 57 and 58. It is to be understood that this lens assembly may be formed of any desired number of separate lens segments.

These lens segments may be retained in a unitary assembly by means of an upper ring member 59 engaging the upper ends of the segments, a center ring 62 interposed between the lower ends of the upper segments and the upper ends of the lower segments, and the channeled rim 63 of the sub-base 21 together with the upper and lower groups of the rods 64 and 65 as shown.

The top opening of the lens assembly 11 may be closed by a detachable cover 66 secured to the upper ring 59 by suitable clamps 67.

In order to provide a readily openable door in the outer lens assembly 11, one of the lower lens segments, 51 in this instance, is independently mounted to provide a door assembly 70 on upper and lower door segments 71 and 72, which are channeled to receive the upper and lower edges of the lens segment 51, and which are connected together by means of two of the lower inside tie rods identified as 65a and 65b, as shown in Fig. 2, and by an additional outside tie rod 73, as shown in Fig. 1.

The outside lip of the channel in the upper rim 63 of the sub-base is cut away to provide a seat for the lower door segment 72, as shown in Fig. 1, which is attached to the sub-base by a suitable hinge 74. The outside lip of the lower channel in the center ring 62 is likewise cut away to receive the upper door segment 71. The door assembly may be held closed by means of suitable adjustable catches 75, only one of which is shown, attached to center ring 62 in a position to engage an upturned ear 76 on the upper door segment.

The lens segments of the inner and outer lens assemblies are preferably formed of material, such as glass, having heat-resisting and high transmitting qualities, and should be annealed to withstand a wide temperature change, such, for example, as from −50° C. to +150° C. in a normal change cycle of ten minutes, and instantaneous changes of from +8° C. to +88° C. by air blast or immersion. All of the mating or abutting portions of the various segments should be ground for close fit, and the joints sealed with a suitable compound, preferably of a permanent plastic type.

In order to provide for effectively controlling the light output to produce the desired beam pattern, the prism structures of the inner and outer lens assemblies are disposed at an angle of 90° to each other, the prism structures of the inner lens being vertical and those of the outer lens being horizontal. Accordingly, the inner lens is active in the horizontal plane only, and the outer lens is active on the vertical plane only. The prism structures on the inner lens may be on the outside, as shown, or on the inside, or both. The prism structures on the outer lens are preferably on the inside to provide a smooth outer surface. The focal point of the outer lens in the vertical plane coincides with the radius point of the inner surface, while the focal point in the horizontal plane coincides with the radius point of the mounting flange, and the same is true of the inner lens.

By means of this lens structure and arrangement, the vertical prisms on the inner lens gather the light flux from the source in a chosen horizontal angle and present it to the outer lens as parallel rays in the horizontal plane, but unaffected in the vertical planes. The prisms on the outer lens being horizontal affect only the vertical plane, thus bending the light rays in a chosen vertical angle to produce parallel rays, or any other desired pattern.

Thus it will be apparent that the inner lens functions to segregate the light flux or rays into a desired number of fan-shaped vertical beams, and the outer lens reduces these beams to the desired vertical divergence.

In view of the foregoing, it will be apparent that my invention provides (1) a beacon capable of producing several beams from a single light source, colored if desired by using colored glass segments in the inner lens assembly; (2) a beacon structure wherein there is complete avoidance of ice-lock and in which the rotating power requirements are reduced to a minimum; (3) a beacon structure which is simple to manufacture, assemble, operate and maintain; and (4) a beacon which is extremely reliable in operation, both from the standpoint of continuity of operation and producing the proper signal.

While I have disclosed a preferred embodiment of my invention, it is to be understood that it is capable of modification as to structural details without departing from the principles of the invention.

I claim as my invention:

1. A rotating beacon light comprising, an outer Fresnel lens of generally globular shape having its prism structure disposed horizontally, a base structure for stationarily supporting said outer lens, said lens being comprised of groups of complementary upper and lower lens segments, means comprising upper and center ring members and tie rods interposed between the upper and center ring members and the center ring member and base structure for retaining said lens segments in assembled relation, an inner Fresnel lens of generally globular shape having its prism structure disposed vertically, support means mounted on the base structure for rotatably supporting the inner lens within and centrally of the outer lens, said inner lens being comprised of a plurality of complementary lens segments, means comprising an upper ring member and a plurality of tie rods interposed between said ring member and the support means for retaining said lens segments in assembled relation, and a means mounted upon the support means for mounting a light source within the inner lens.

2. A rotating beacon light comprising, an outer Fresnel lens assembly of generally globular shape and being formed of upper and lower groups of complementary lens segments connected together to provide a unitary assembly, said lens assembly having top and bottom openings, a cover for the top opening, a base structure for supporting said lens assembly, said base structure having an upper rim portion adapted to receive and seat the lower edge of the lens assembly, an inner Fresnel lens assembly of generally globular shape and being formed of a plurality of lens segments connected together to provide a unitary assembly, said inner lens assembly having a bottom opening, support means rotatably mounted on the base structure and extending upwardly through the bottom opening of the outer lens assembly for rotatably supporting the inner lens assembly centrally of the outer lens assembly, said support means being adapted to receive the lower end of the inner lens assembly, means mounted on the support means and extending upwardly through the bottom opening of the inner lens assembly for supporting a light source therein, and driving means mounted in the base structure for actuating the rotatable support means.

3. A beacon light comprising, an outer lens of generally globular shape, a base structure for stationarily supporting the outer lens, an inner lens of generally globular shape rotatably mounted upon the base structure within the outer lens, said outer lens being comprised of a plurality of complementary upper and lower lens segments, means including a plurality of tie rods connecting all but one of said lens segments into a unitary assembly to the base structure, and means for hingedly attaching the said other one of said lens segments to the base structure to provide a door in the outer lens.

4. A beacon light comprising, a generally globular lens assembly, a base having a rim for supporting said lens assembly in a stationary manner, said lens assembly being comprised of a plurality of complementary lens segments positioned on the rim of the base, means including a plurality of tie rods and a retaining ring attached to the base for holding all of the lens segments except one in assembled relation on the base, a portion of the rim of the base individual to the said one lens segment being separate from the other part of the rim and hinged thereto, a portion of the retaining ring individual to the said one segment being separate from the other part of the ring, a plurality of tie rods connecting the separate portions of the rim and ring, and means for detachably securing the separate portion of the ring to the other main part thereof, thereby to provide a door in the lens assembly.

5. A rotating beacon light comprising, a base structure, a generally globular lens assembly mounted on the base structure, said lens assembly being comprised of a plurality of upper and lower groups of complementary lens segments, said base structure having an upper rim to receive the lower edge of the lens assembly, a portion of said upper rim corresponding to one lens segment being separate from the other part of the rim and hinged to the base structure, an upper retaining ring positioned on the upper edge of the upper lens segments, an intermediate retaining ring positioned between the upper and lower groups of lens segments, a portion of said intermediate ring individual to the said one segment being separate from the other part of the ring and detachably secured thereto, a plurality of tie rods connecting the intermediate ring with the upper ring and the base structure, and additional tie rods connecting the separate portions of the intermediate ring and upper rim of the base structure, thereby to provide a door in the lens assembly.

WILLIS A. PENNOW.

REFERENCES CITED

The following references are of record in the file of this patent:

UNITED STATES PATENTS

| Number | Name | Date |
|---|---|---|
| 1,095,208 | Humphrey | May 5, 1914 |
| 1,337,880 | Benard | Apr. 20, 1920 |
| 1,988,569 | Rechtin | Jan. 22, 1935 |
| 2,017,052 | Bartow | Oct. 15, 1935 |
| 2,021,611 | Rolph | Nov. 19, 1935 |
| 2,096,755 | Parsberg | Oct. 26, 1937 |

FOREIGN PATENTS

| Number | Country | Date |
|---|---|---|
| 13,090 | Great Britain | 1915 |
| 672,378 | France | 1929 |